United States Patent [19]

Schütz et al.

[11] Patent Number: 5,093,123
[45] Date of Patent: Mar. 3, 1992

[54] PROCESS FOR THE REMOVAL OF PESTICIDES FROM GINSENG ROOTS

[75] Inventors: Erwin Schütz, Trostberg; Heinz-Rüdiger Vollbrecht, Altenmarkt, both of Fed. Rep. of Germany

[73] Assignees: SKW Trostberg Aktiengesellschaft, Trostberg; Pharma-Zentrale GmbH, Herdecke, both of Fed. Rep. of Germany

[21] Appl. No.: 473,296

[22] Filed: Feb. 1, 1990

[30] Foreign Application Priority Data

Feb. 4, 1989 [DE] Fed. Rep. of Germany ....... 3903374

[51] Int. Cl.$^5$ ............................................. A61K 35/78
[52] U.S. Cl. .................................. 424/195.1; 426/286; 426/422
[58] Field of Search ..................... 424/195.1; 426/286, 426/422

[56] References Cited

U.S. PATENT DOCUMENTS

| | | | |
|---|---|---|---|
| 3,901,875 | 8/1975 | Park | 260/210.5 |
| 4,104,409 | 8/1978 | Vitzthum | 426/386 |
| 4,684,740 | 8/1987 | Higuchi | 549/464 |
| 4,842,878 | 5/1989 | Forster | 426/286 |
| 4,946,695 | 8/1990 | Forster | 426/286 |

*Primary Examiner*—John W. Rollins
*Assistant Examiner*—Ralph Gitomer
*Attorney, Agent, or Firm*—Felfe & Lynch

[57] ABSTRACT

Pesticides are removed from ginseng roots by extracting ginseng roots having a moisture content of 14 to 65% by weight with carbon dioxide at a pressure of more than 100 bar and at a temperature of more than 40° C.

8 Claims, No Drawings

PROCESS FOR THE REMOVAL OF PESTICIDES FROM GINSENG ROOTS

FIELD OF THE INVENTION

The present invention is concerned with a process for the removal of pesticides from ginseng roots by extraction with compressed carbon dioxide.

BACKGROUND OF THE INVENTION

The content of pesticides in those plants which are intended to be used for outaining of drug is, in many countries, limited by stringent regulations and is one of the most important criteria for the commercial usefulness of drugs. Therefore, the removal of pesticides from these drugs with the simultaneous maintenance of the full activity spectrum is of great interest, especially when it is a question of very valuable materials.

A prerequisite for a removal of these undesired pesticides by means of extraction with a solvent is that the extraction is sufficiently selective, i.e. only the undesired substances are extracted, and, on the other hand, after the extraction the drug is also present in a useable condition, i.e. is free from undesired residues of solvents. It is known that a high pressure extraction with supercritical carbon dioxide fulfils this latter prerequisite.

Thus, for example, German Offenlegungschrift No. 36 32 401 describes the production of hop extracts with a low content of pesticides from hops which are laden with pesticides. In that process, in a first step, the pesticides and the component materials of the hops are extracted with compressed gases and, in a subsequent step, there is carried out a separation of extract and pesticides with the aid of a solid adsorption agent. However, a complete extraction of the pesticides from the hops is not desired since the extract is to be further used. A further disadvantage is the insufficient selectivity of the adsorption agent since, besides the pesticides, desired hop component materials are also bound and thus the yields are reduced.

Furthermore, from "Verdichtet Gase zur Extraktion und Raffination", pub. by Springer Verlag, pp. 231-233/1987, it is known to remove pesticides from senna leaves with dry, supercritical carbon dioxide in which case the content of chlorinated pesticides is reduced by up to 98% without the polar active materials, the sennosides, being co-extracted.

However, the application of the process which is successful in the case of senna leaves to ginseng roots has proved to be impossible. The ginsenosides, regarded as being the active materials, are admittedly not extracted with supercritical carbon dioxide but the chlorinated pesticides are also not removed in a satisfactory manner. Thus, for example, quintozene (pentachloronitrobenzene), which is to be regarded as being the main contamination of ginseng roots and thus as a leading substance for undesired, lipophilic, chlorinated pesticides, is only reduced to about 30% so that the extracted ginseng roots do not even approach the region of commercial usefulness when the pesticide content thereof exceeds the permitted value by a factor of 100, which can certainly occur.

OBJECT OF THE INVENTION

Therefore, it is an object of the present invention to provide a process for the removal of pesticides from ginseng roots by extraction with compressed carbon dioxide which does not suffer from the above mentioned disadvantages of the prior art and which makes possible, with technically simple means, the achievement of a substantial removal of the pesticides without thereby having to accept significant losses of active materials.

DESCRIPTION OF THE INVENTION

Thus, according to the present invention, there is provided a process for the removal of pesticides from ginseng roots by extraction with compressed carbon dioxide, wherein, before the extraction, the ginseng roots have a moisture content of from 14 to 65% by weight.

Surprisingly, we have found that, with the process according to the present invention, the undesired pesticides can be removed practically completely, whereas the important active materials remain in the roots.

This is especially surprising because the chlorinated pesticides, such as quintozene, are practically water-insoluble. Furthermore, the extraction yields in the case of the process according to the present invention are substantially higher than in the case of the addition of organic solvents, for example ethanol, acetone or ethyl acetate, although the pesticides in question are substantially better soluble in these organic entraining agents.

In the case of the process according to the present invention, the ginseng roots, which, as a rule, after drying have a natural water content of about 8 to 10% by weight, are advantageously ground before the extraction and subsequently, preferably by the addition of water, brought to a moisture content of 14 to 25% by weight. This can be achieved, for example, by the addition of about 4 to 20% by weight of water, referred to the starting weight of the roots. The amount of carbon dioxide used in the case of ground ginseng roots should preferably be from 10 to 100 kg of carbon dioxide per kg of roots. The moistening of the ginseng roots can take place in conventional mixing apparatus and according to known technical processes. Care should thereby be taken that, in the case of the moistening, no lump formation of the ground roots takes place. In a preferred embodiment of the process according to the present invention, the roots are moistened by a slow spraying with water in a mixing apparatus.

Instead of in a ground state, the ginseng roots can be used whole or in a coarsely comminuted form. However, in the case of whole or coarsely comminuted roots, longer extraction times and larger amounts of carbon dioxide are necessary. Thus, for example, for a 90% decontamination, there are required 5 to 10 hours and 100 to 1500 kg of carbon dioxide per kg of roots. In the case of whole roots, the moisture content can also amount to up to 60% by weight, whereas in the case of ground roots, only a moisture content of about 25% by weight is possible (above 25% by weight, a lumping together takes place, whereby a processability is no longer provided). Thus, in the case of the use of whole roots, an addition of water of 4 to 125% by weight, referred to the starting weight of the roots, is possible.

Finally, the ginseng roots can be used for the extraction in a harvested and non-dried form, in which case an addition of water is generally not necessary. Possibly after this moistening step, the ginseng roots are subjected to the extraction with compressed carbon dioxide, in which case the carbon dioxide can be present in liquid or supercritical state. The extraction conditions can be varied in wide limits, but for the achievement of a favorable extraction time, it is preferred to work at a pressure of above 100 bar and at a temperature above 40° C. Especially preferably, the extraction is carried out at a pressure of from 200 to 350 bar and at a temperature of 60° to 90° C. The amount of carbon dioxide should preferably be so chosen that the total throughput amounts to 10 to 1500 of carbon dioxide per kg of ginseng roots.

In the scope of the present invention, it is possible to extract not only with moist but also with dry carbon dioxide. In a preferred embodiment of the process according to the present invention, the moisture content of the drug is first kept constant by extraction with moist carbon dioxide and then further extraction with dry carbon dioxide, whereby the water content decreases.

By means of this process variant, when, in addition, the selected extraction temperature is not too low, a possible subsequent drying period can be shortened or a drying step can be completely saved. If desired, a drying of the extracted ginseng roots can follow the extraction, in which case the particularly desired moisture content can be adjusted with the use of conventional apparatus.

With the aid of the process according to the present invention, it is possible to reduce the pesticide content in the ginseng roots by more than 99.7%. It is thereby readily possible to go below the highest permissible amounts which, for example, according to the German regulations for the highest amounts of pesticidal agents is 20 ppb in the case of quintozene. Furthermore, in the case of this process, the content of the active materials (ginsenosides) is not changed. Only components of the essential oil and lipophilic substances, for example waxes, are coextracted to a significant extent.

The separation of the pesticides from the carbon dioxide can be carried out by lowering the density or by adsorption on an appropriate adsorption agent, for example active carbon, in which case the adsorbont can be present in a separate pressure vessel or also in the same pressure vessel, separately or also in admixture with the extraction material.

The following Examples are given for the purpose of illustrating the present invention:

EXAMPLE 1

Comparison 1.5 kg of ground ginseng roots with a moisture content of 9.3% by weight were extracted for 72 minutes with dry carbon dioxide at a pressure of 250 bar and at a temperature of 80° C. The residual content of quintozene was 70% of the initial value.

EXAMPLE 2

1.5 kg of ground ginseng roots were brought to a moisture content of 17.5% by weight by slow spraying with 150 g of water in a mixing apparatus and then extracted for 72 minutes with dry carbon dioxide at a pressure of 250 bar and at a temperature of 80° C. By means of the extraction, the content of quintozene was reduced to 6% of the initial value. A drying of the extracted material (moisture content 9.8% by weight) was not necessary.

EXAMPLE 3

1.5 kg of ground ginseng roots were brought to a moisture content of 18.3% by weight by slow spraying with 150 g of water in a mixing apparatus and extracted for 30 minutes with moist carbon dioxide and thereafter for 60 minutes with dry carbon dioxide (the same parameters as in Example 1). The content of quintozene was reduced by the extraction to 0.3% of the initial value. A drying of the extracted material (moisture content 9.9% by weight) was not necessary.

EXAMPLE 4

0.6 kg of whole ginseng roots were brought to a moisture content of 35% by weight by slow spraying with 220 g of water in a mixing apparatus and extracted for 8 hours with moist carbon dioxide at a pressure of 250 bar and at a temperature of 80° C. The content of quintozene was reduced by the extraction to 10% of the initial value. After the extraction, the extracted roots were dried at a temperature of 50° C. in a current of air.

We claim:

1. The method of selectively extracting pesticides from ginseng roots, which comprises adjusting the moisture content of the ginseng roots to 14 to 65% by weight by adding water, and extracting the moistened ginseng root with carbon dioxide at a pressure of more than 100 bar and at a temperature of more than 40° C.

2. The method of claim 1, wherein the moisture content of the ginseng root is adjusted to 14 to 65% by weight by adding to the ginseng roots 4 to 125% by weight of water, based on the starting weight of the roots.

3. The method of claim 1, wherein the ginseng root starting material is freshly harvested and non-dried ginseng root.

4. The method of claim 1, wherein the ginseng root starting material is ground ginseng root.

5. The method of claim 1, wherein the ginseng root starting material is whole or coarsely comminuted ginseng root.

6. The method of claim 1, wherein the ginseng root starting material is moistened by slowly spraying it with water in a mixing apparatus.

7. The method of claim 1, wherein the moistened ginseng root is extracted with carbon dioxide at a pressure of 200 to 350 bar and at a temperature of 60° to 90° C.

8. The method of claim 1, wherein the moisture content of the ginseng root is initially kept constant by extraction with moist carbon dioxide and the moisture content is subsequently allowed to decrease by extraction with dry carbon dioxide.

* * * * *